US010735745B1

(12) United States Patent
Liu et al.

(10) Patent No.: US 10,735,745 B1
(45) Date of Patent: Aug. 4, 2020

(54) METHOD AND APPARATUS FOR VIDEO CODING

(71) Applicant: Tencent America LLC, Palo Alto, CA (US)

(72) Inventors: Shan Liu, San Jose, CA (US); Xiaozhong Xu, State College, PA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/433,746

(22) Filed: Jun. 6, 2019

(51) Int. Cl.
H04N 11/02 (2006.01)
H04N 19/159 (2014.01)
H04N 19/172 (2014.01)
H04N 19/176 (2014.01)

(52) U.S. Cl.
CPC ......... H04N 19/159 (2014.11); H04N 19/172 (2014.11); H04N 19/176 (2014.11)

(58) Field of Classification Search
CPC .................................................. H04N 19/159
USPC ........................................ 375/240.01–240.29
See application file for complete search history.

(56) References Cited

U.S. PATENT DOCUMENTS 7,599,438 B2 * 10/2009 Holcomb ............. H04N 19/147
375/240.23
8,340,510 B2 * 12/2012 Wu ........................ H04N 5/783
386/343
8,526,498 B2 * 9/2013 Lim ...................... H04N 19/159
375/240.13
9,635,385 B2 * 4/2017 Kudana .................. H04N 19/56
9,832,463 B2 * 11/2017 Pettersson .............. H04N 19/70
9,872,045 B2 * 1/2018 Zhu ......................... H04N 19/61

OTHER PUBLICATIONS

High Efficiency Video Coding , Rec. ITU-T H.265v4, Dec. 2016.
B. Bross, J. Chen, S. Liu, "Versatile Video Coding (Draft 3)", ISO/IEC JTC1/SC29/WG11 JVET-L1001, Oct. 2018.

* cited by examiner

Primary Examiner — Leron Beck
(74) Attorney, Agent, or Firm — Oblon, McClelland, Maier & Neustadt, L.L.P.

(57) ABSTRACT

Aspects of the disclosure provide a method and an apparatus for video encoding/decoding. Processing circuitry of the apparatus can decode first prediction information of a first coding block in a first key picture from a coded video bitstream. The first key picture is one of multiple key pictures in a video sequence and includes a first intra coded region and a first inter coded region. When the first prediction information indicates that the first coding block is in the first intra coded region, the processing circuitry reconstructs at least one sample of the first coding block based on the first intra coded region. When the first prediction information indicates that the first coding block is in the first inter coded region, the processing circuitry reconstructs the at least one sample of the first coding block based on a region different from the first inter coded region.

20 Claims, 14 Drawing Sheets

METHOD AND APPARATUS FOR VIDEO CODING

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry decodes first prediction information of a first coding block in a first key picture from a coded video bitstream. The first key picture is one of multiple key pictures in a video sequence and includes a first intra coded region and a first inter coded region. The first prediction information indicates that the first coding block is in one of: the first intra coded region and the first inter coded region. When the first prediction information indicates that the first coding block is in the first intra coded region, the processing circuitry reconstructs at least one sample of the first coding block based on the first intra coded region. When the first prediction information indicates that the first coding block is in the first inter coded region, the processing circuitry reconstructs the at least one sample of the first coding block based on a region different from the first inter coded region.

In an embodiment, the processing circuitry decodes second prediction information of a second coding block in a second key picture of the multiple key pictures from the coded video bitstream. The second key picture includes a second intra coded region and a second inter coded region. The second prediction information indicates that the second coding block is in one of: the second intra coded region and the second inter coded region. When the second prediction information indicates that the second coding block is in the second intra coded region, the processing circuitry reconstructs at least one sample of the second coding block based on the second intra coded region. When the second prediction information indicates that the second coding block is in the second inter coded region, the processing circuitry reconstructs the at least one sample of the second coding block based on a region different from the second inter coded region. In an example, the multiple key pictures are consecutive pictures in a decoding order in the video sequence.

In an embodiment, the multiple key pictures include intra coded regions having relative locations in the respective multiple key pictures and inter coded regions where the intra coded regions include the first intra coded region and the inter coded regions include the first inter coded region. The relative locations of the intra coded regions are different. In an example, a sum of sizes of the intra coded regions is equal to a size of the first key picture.

In an embodiment, the first intra coded region is one of: a slice, a tile, and a tile group.

In an embodiment, the first prediction information further indicates that the first inter coded region is in a previous random access interval and the first intra coded region is in a current random access interval, a random access point separates the previous and the current random access intervals in the video sequence, the first key picture is to be reconstructed first in the multiple key pictures and the region different from the first inter coded region is in one of: the previous random access interval and the first key picture. In an example, the first key picture includes one or more intra coded regions including the first intra coded region. The multiple key pictures includes a second key picture that has a second intra coded region and a second inter coded region that is decoded after the second intra coded region where the second key picture is reconstructed second in the multiple key pictures. The processing circuitry determines whether at least one of the one or more intra coded regions has a same relative location in the first key picture as that of the second inter coded region in the second key picture. When at least one of the one or more intra coded regions and the second inter coded region are in the same relative location, the processing circuitry decodes the second inter coded region based on at least one of: the one or more intra coded regions and the second intra coded region only when the at least one of the one or more intra coded regions and the second intra coded region is in the current random access interval. When none of the one or more intra coded regions and the second inter coded region are in the same relative location, the processing circuitry decodes the second inter coded region based on at least one of: the previous random access interval, the first key picture, and the second intra coded region.

In an embodiment, the first prediction information further indicates that the first key picture is to be reconstructed first in a random access interval of a random access point in the video sequence and the random access point for the random access interval starts from the first intra coded region. In an example, the multiple key pictures have intra coded regions including the first intra coded region and inter coded regions including the first inter coded region. The region different from the first inter coded region is the first intra coded region. The processing circuitry decodes the remaining inter coded regions other than the first inter coded region based only on the random access interval.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
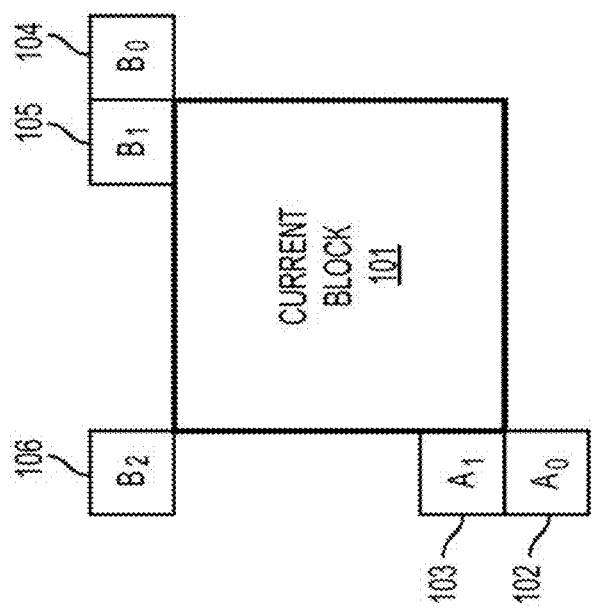
FIG. 1 is a schematic illustration of a current block and its surrounding spatial merge candidates in one example.
Figure 2:
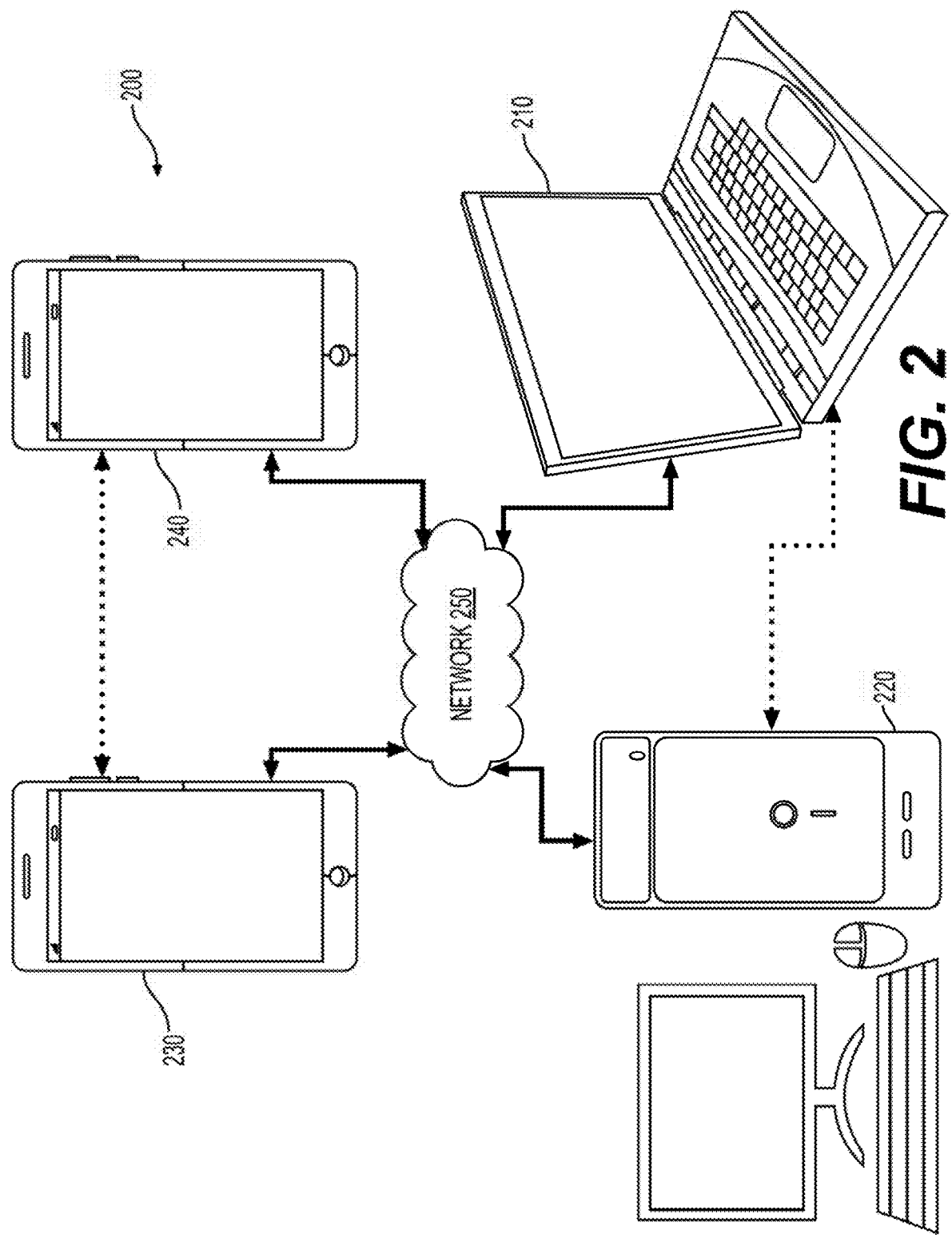
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
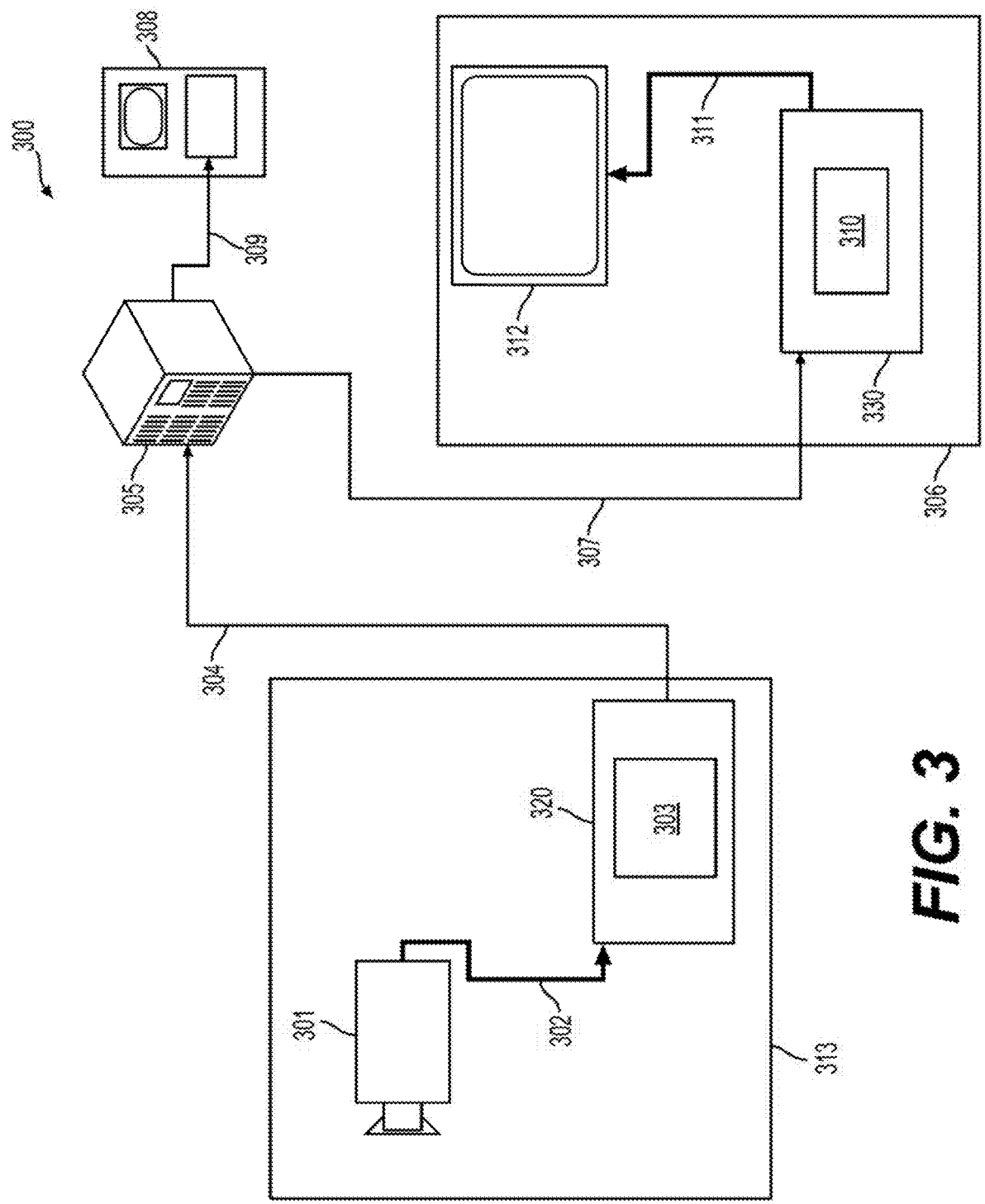
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
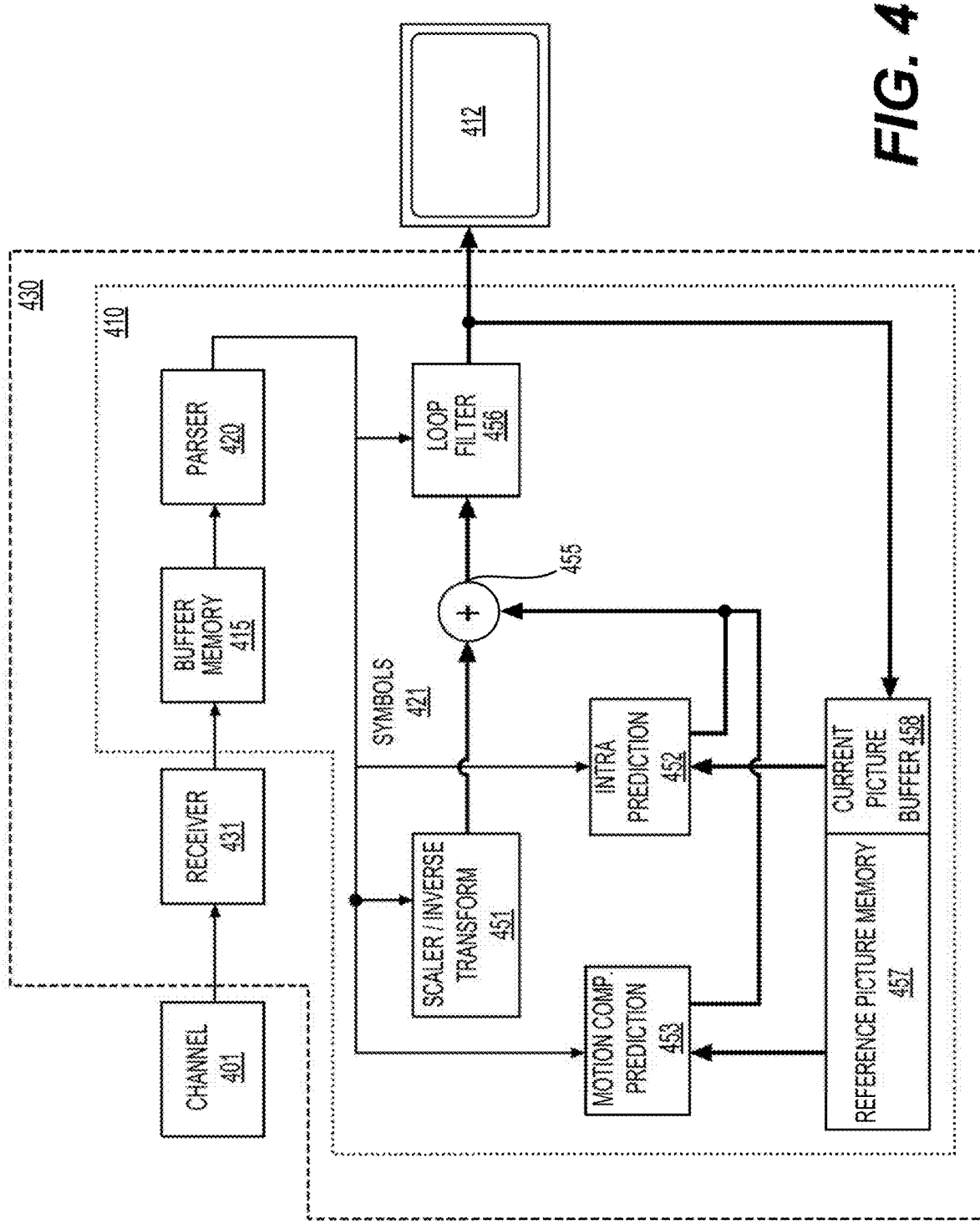
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
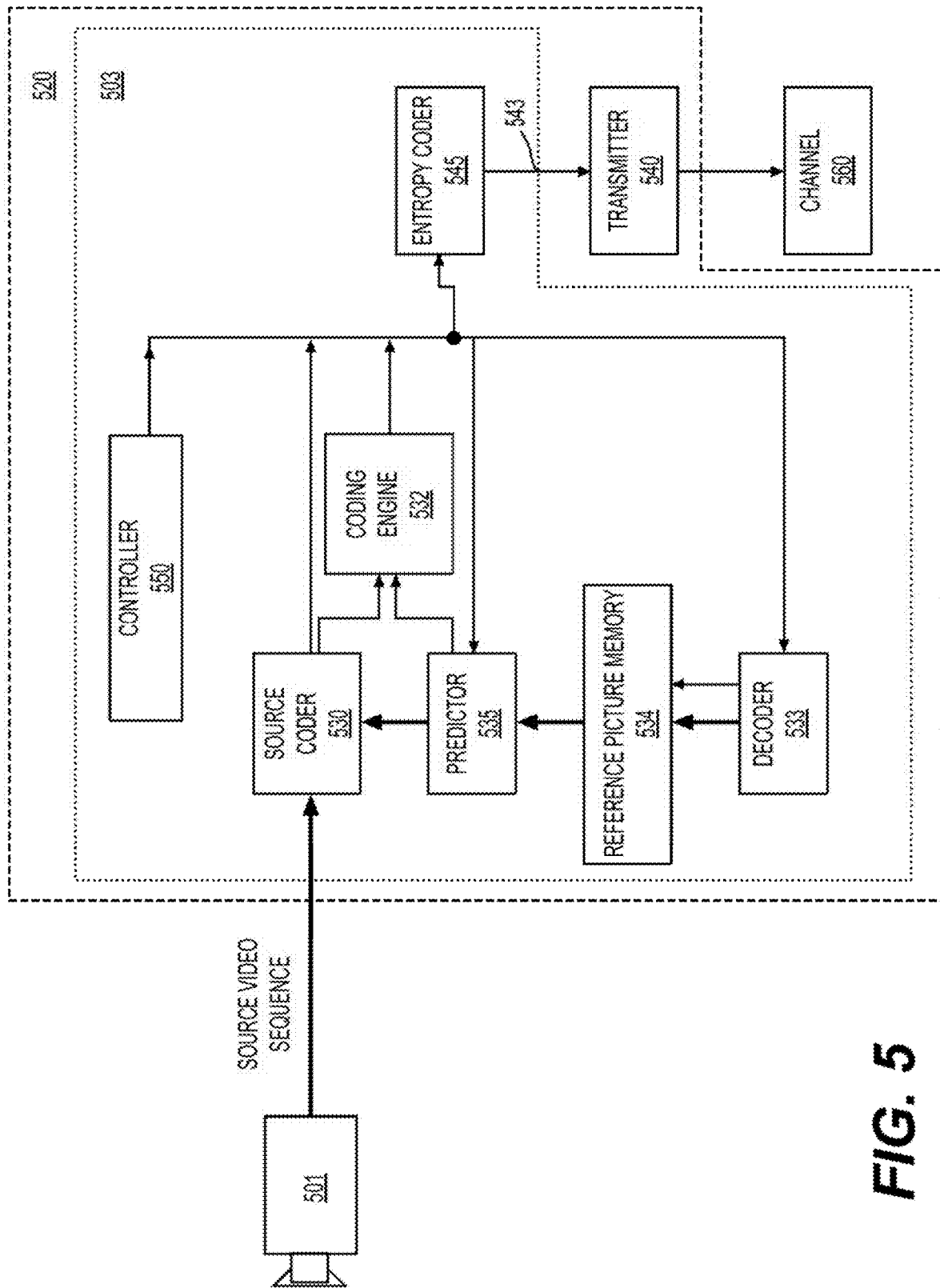
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks ofI: pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
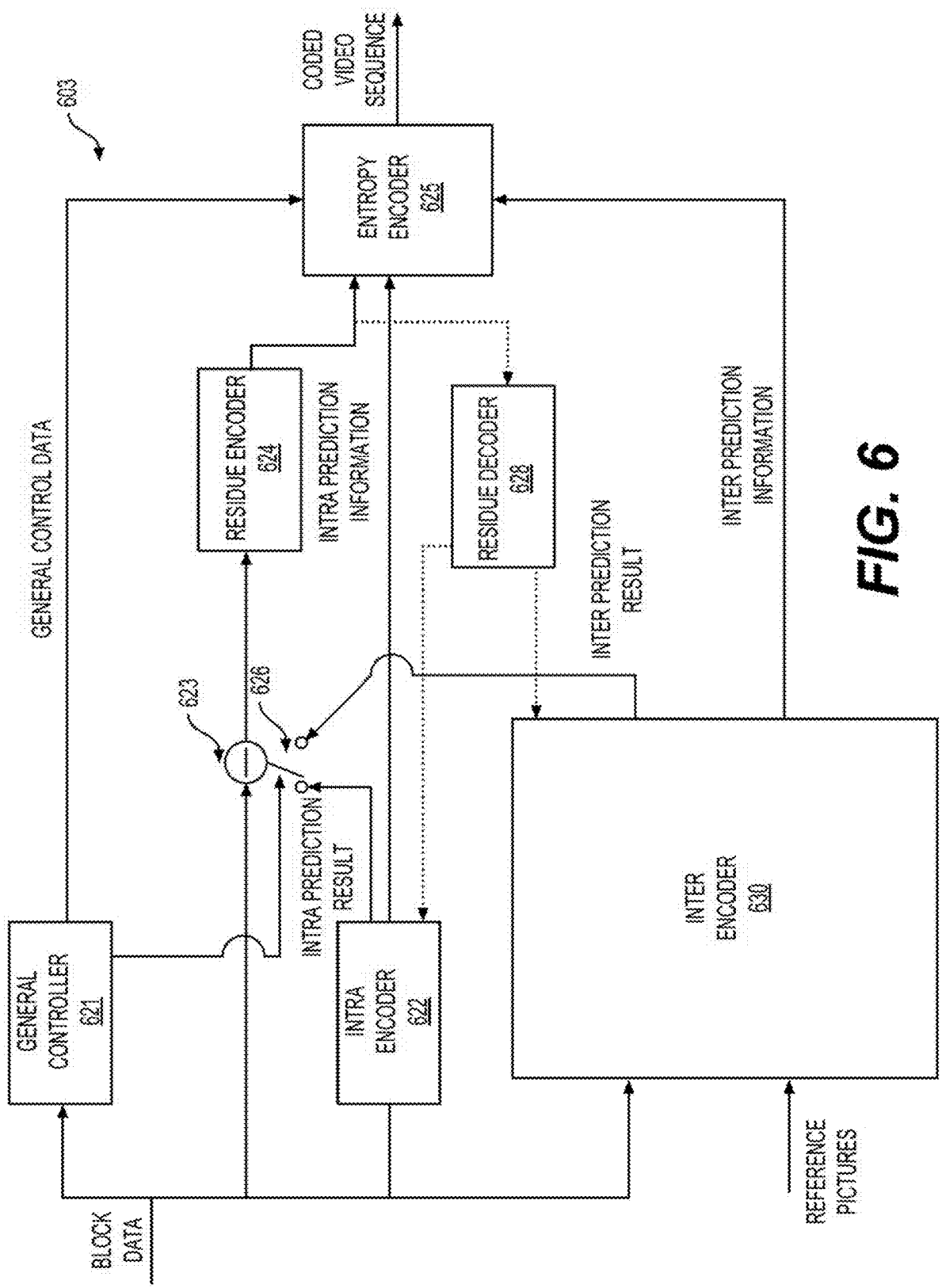
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
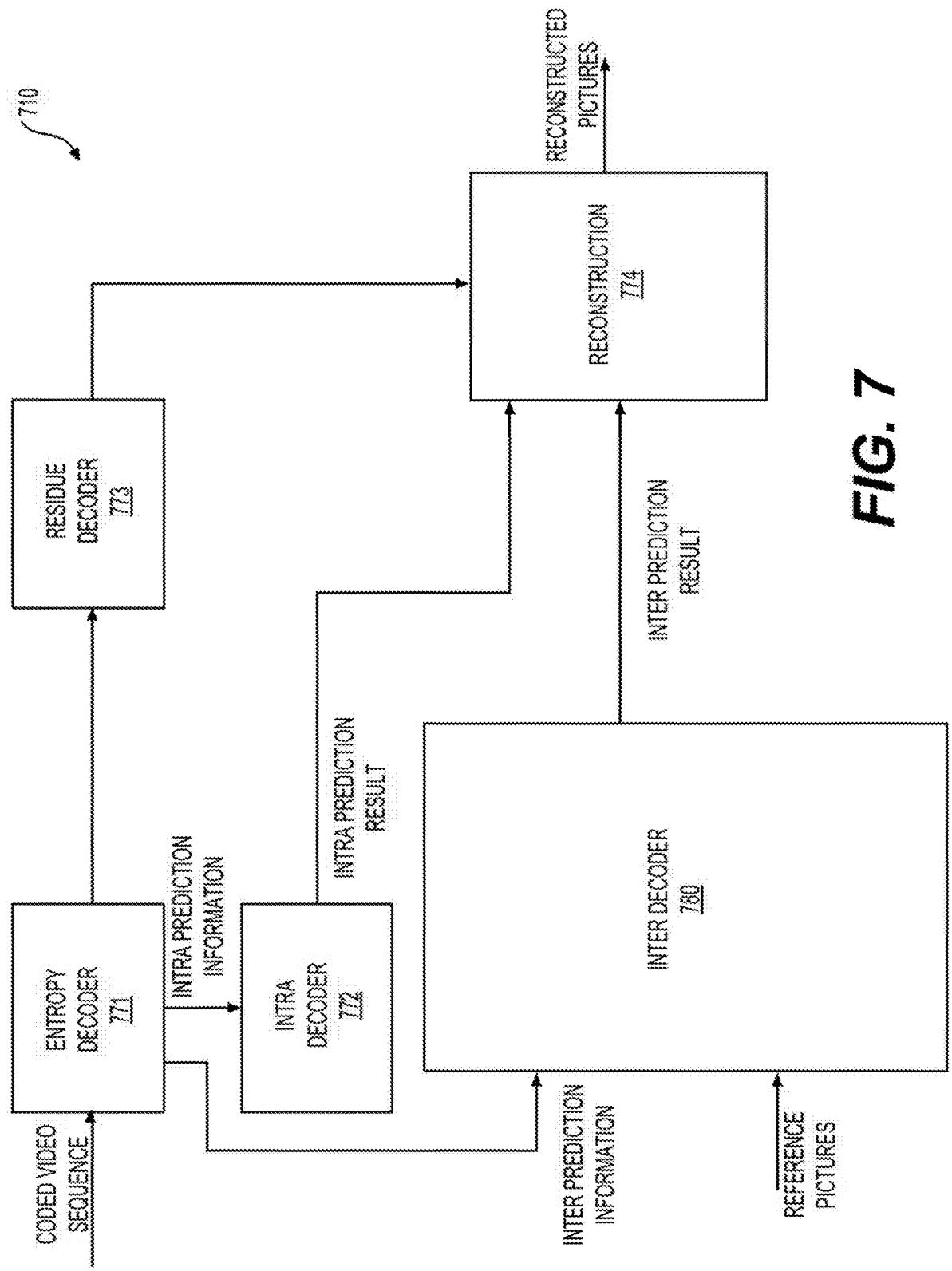
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide apparatuses and methods for bandwidth smoothing for video transmission, for example in the context of error prone and/or bandwidth limited channels. The bandwidth smoothing may be performed using intra segmentations over multiple pictures, for example by using intra coded regions in multiple key pictures of a video sequence.

A picture to be coded first (also referred to as a first picture) in a video sequence is typically coded using intra prediction. Therefore, the first picture can be referred to as an I picture (intra-coded picture). Inter coded pictures, such as a P picture (predicted picture), a B picture (bidirectional predicted picture), or the like, can be dependent on one or more previously coded pictures. I pictures are coded independently and can serve as reference pictures for subsequent P or B pictures.

In terms of coding errors or video transmission errors, an I picture can be used to prevent error propagation among subsequent pictures decoded after the I picture, for example, errors in pictures decoded before the I picture do not propagate to the subsequent pictures decoded after the I picture. In terms of random access functionality, it is desirable to insert one or more I pictures in the video sequence in addition to the first picture so that a video bitstream can be accessed not only from the beginning of the video sequence but also from one or more other locations across the video sequence. The I pictures serving the above described purposes can be referred to as "key pictures". A key picture can be coded using intra prediction only, for example, when there are no segmentations in the key picture.

An intra coded region refers to a region where samples in the region may use information from coded part of the same region for reference. Therefore, the intra coded region can be reconstructed based on information of the intra coded region. In an example, the intra coded region is a slice, a tile, a tile group, or the like, and thus, can also be referred to as an intra coded slice (also referred to as an I slice or an I_slice), an intra coded tile (also referred to as an I tile), an intra coded tile group (also referred to as an I tile group), or the like. An intra coded region can cover all or a portion of a picture according to different embodiments. Further, an intra coded region that covers all of the picture may be referred to as an intra coded picture where samples in the picture may use information from the coded part of the same picture for reference. Therefore, the intra coded picture can be reconstructed based on information of the intra coded picture.

An inter coded region refers to a region where samples in the region may use information from one or more previously coded regions in addition to the coded part of the same region for reference. In an example, the inter coded region is a slice, a tile, a tile group, or the like. An inter coded slice can be a P slice, a B slice, or the like. In an embodiment, the P slice can be coded using at most one motion vector and reference index to predict sample values of the P slice and the B slice can be coded using at most two motion vectors and reference indices to predict sample values of the B slice. An inter coded tile can be a P tile, a B tile, or the like. An inter coded slice can be a P tile group, a B tile group, or the like. The descriptions of the P tile and P tile group are similar to that of the P slice, and the descriptions of the B tile and B tile group are similar to that of the B slice.

An inter coded region can cover all or a portion of a picture according to different embodiments. Further, an inter coded region that covers all of the picture may be referred to as an inter coded picture where samples in the picture may use information from one or more previously coded pictures in addition to the coded part of the same picture for reference. The inter coded picture can be a P picture, a B picture, or the like.

For the purpose of random access or error resilience, in a coded video sequence, key pictures can be periodically inserted between inter coded pictures. In an embodiment, the key pictures are I pictures. In an example, a video bitstream structure is: I-P-P-P-P-P-P-P-I-P-P-P-P-P-P . . . where I and P refer to an I picture and a P picture, respectively. In another example, a video bitstream structure is: I-B-B-P-B-B-P-B-B-I-B-B-P-B-B-P-B-B- . . . where B refers to a B picture. In general, coding efficiency using inter coded pictures with motion compensation is higher than coding efficiency using an intra coded picture. Therefore, bandwidth required to transmit an inter coded picture can be significantly less than bandwidth required to transmit an intra coded picture. For example, in a coded video bitstream with an I-P-P-P structure or an I-B-B-P structure, the intra coded picture(s) or key picture(s) can use much more bandwidth than other pictures such as the P or B pictures.

Bandwidth used for an intra coded picture in a video bitstream can exceed a maximum allowed bandwidth (also referred to as a bandwidth capacity) of a video transmission channel. For example, the bandwidth capacity for a video transmission channel can be 1 Mb/s while an intra coded picture can result in a 2 Mb/s bandwidth consumption. Thus, 2 seconds can be required to deliver 1 second of video content coded in intra prediction over the video transmission channel with a 1 Mb/s bandwidth capacity. The intra coded pictures exceeding a bandwidth capacity of a video transmission channel, for example, can cause issues such as long end-to-end transmission delay and are undesirable for efficient video delivery.

To reduce the challenge of having an intra coded picture with a large bandwidth requirement, the intra coded picture can be split into multiple regions, such as two regions. In an embodiment, the two regions can include an intra coded slice and an inter coded slice (such as a P slice or a B slice).

The inter coded slice can achieve higher coding efficiency as compared to using intra prediction only because samples in the inter coded slice can refer to not only information within the same inter coded slice but also to the previously coded I slice of the same picture. Therefore, a bandwidth requirement for coding of the intra coded picture (such as a picture to be coded first in a video sequence) can be reduced and the bandwidth distribution for the video sequence can be smoothed. In an example, the bandwidth requirement for the intra coded picture is the highest in the video sequence and thus corresponds to a peak bandwidth of the video sequence. Accordingly, the peak bandwidth of the video sequence is reduced and a distribution of bandwidths of the video sequence is smoothed.

Various embodiments of the disclosure provide methods and apparatuses to improve the coding efficiency and error resiliency of a coded video sequence.

A key picture can be selected and coded using intra prediction only and thus, the key picture is also an intra coded picture. Subsequent pictures in a video sequence after the key picture may only refer to the key picture or other reference picture(s) that also refer to the key picture. According to embodiments of the disclosure, multiple intra coded regions can be inserted into a coded video sequence, for example, for the refreshment purpose. Further, the multiple intra coded regions can be allocated in multiple pictures instead of a single key picture. Each of the multiple pictures having at least one of the multiple intra coded regions can also be referred to as a key picture in the present disclosure. That is, a key picture can be a picture that includes at least one intra coded region. The key picture can include an intra coded region and an inter coded region in some embodiments.

According to an embodiment of the disclosure, multiple key pictures are included in a video sequence. The multiple key pictures include intra coded regions where each of the multiple key pictures includes one or more of the intra coded regions. In an example, one or more of the multiple key pictures also includes an inter coded region. In another example, each of the multiple key pictures includes an inter coded region. For example, the multiple key pictures include a first key picture and a second key picture. The first key picture includes a first intra coded region and a first inter coded region. The second key picture includes a second intra coded region and a second inter coded region. The first intra coded region can be coded based on information of the first intra coded region only, the second intra coded region can be coded based on information of the second intra coded region only, the first inter coded region can be coded based on information of one or more previously coded regions, and the second inter coded region can be coded based on information of one or more previously coded regions. The first key picture and the second key picture are consecutive pictures in a decoding order of the video sequence according to one embodiment. In another embodiment, the first key picture and the second key picture are not consecutive pictures in the decoding order of the video sequence.

A number of the multiple key pictures can be any suitable number and can vary, such as 2, 3, 4, . . . , a GOP size (a number of pictures in the GOP), or the like. The number of the multiple key pictures can be a positive integer larger than 1 in one embodiment. In one embodiment, the number of the multiple key pictures is smaller than or equal to the GOP size.

Figure 8:
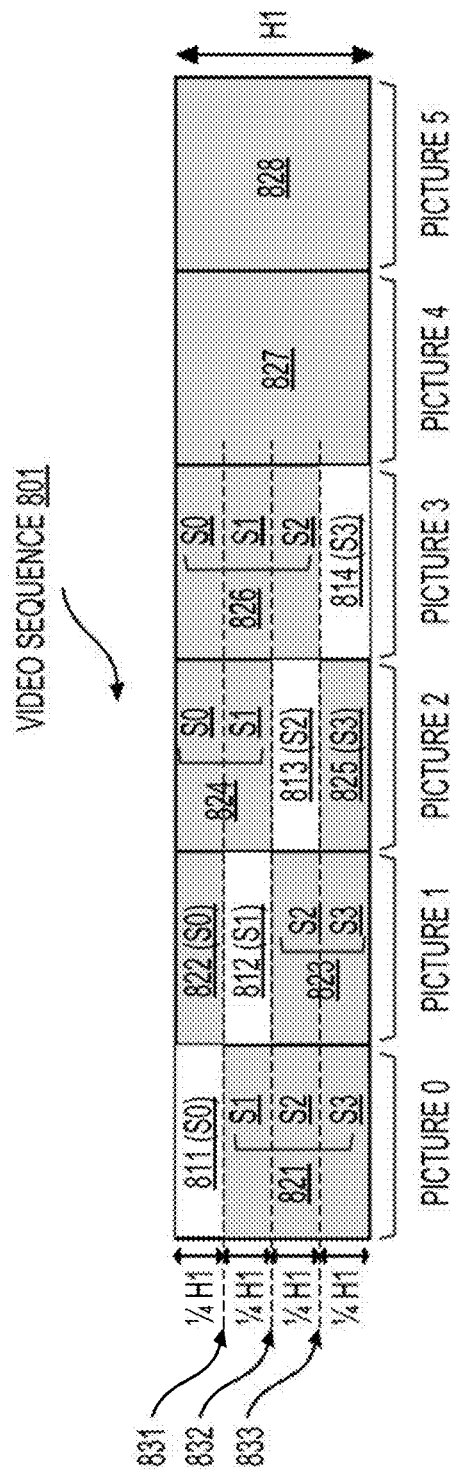
FIG. 8 shows examples of multiple key pictures according to some embodiments of the disclosure.
Figure 9:
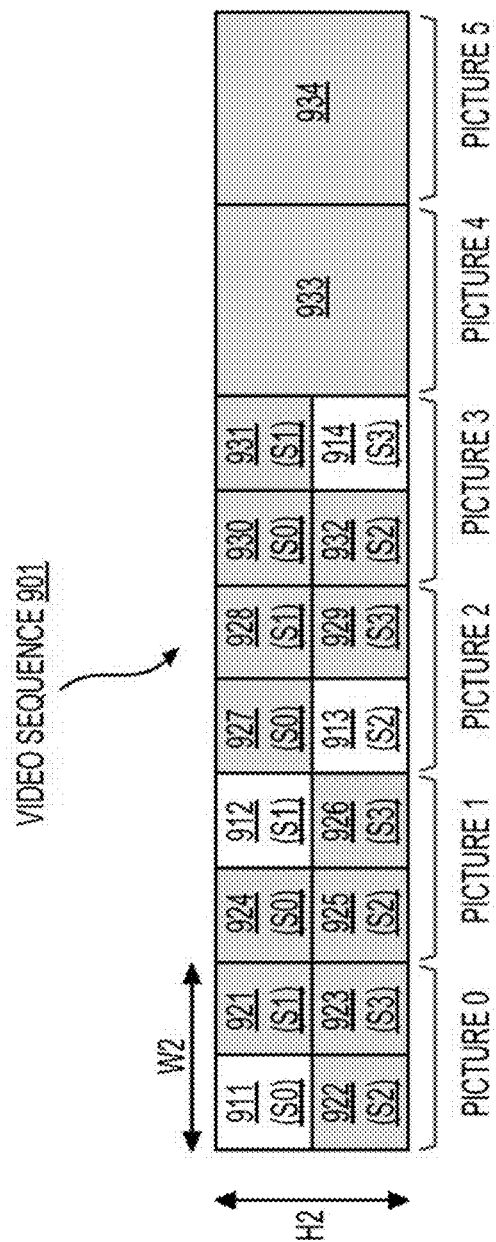
FIG. 9 shows examples of multiple key pictures according to some embodiments of the disclosure.
Figure 10:
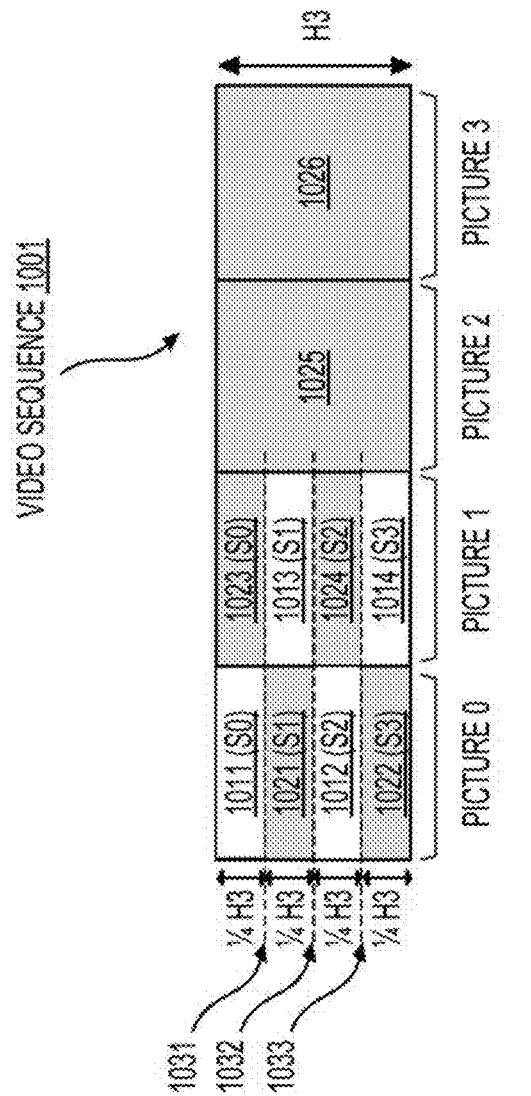
FIG. 10 shows examples of multiple key pictures according to some embodiments of the disclosure.

The multiple key pictures can be consecutive pictures in a decoding order in a video sequence, such as shown in FIGS. 8-10. In an embodiment, the intra coded regions in the multiple key pictures of the video sequence are complementary, for example, in terms of relative locations of the intra coded regions in the respective multiple key pictures and sizes of the intra coded regions. For example, each of the intra coded regions in the respective multiple key pictures are in different relative positions. When a number of the intra coded regions is equal to N (a positive integer larger than 1), each of the multiple key pictures can include the same number (i.e., N) of sections (i.e., sections 0 to N−1) having a section size that is 1/N of a picture size. The N sections in each of the multiple key pictures have different relative locations and do not overlap. The N intra coded regions correspond to the sections 0 to (N−1) in the respective multiple key pictures. In an example, N is 4, the multiple key pictures correspond to pictures 0 to 1, and the 4 intra coded regions correspond to the sections 0 and 2 in the picture 0 and the sections 1 and 3 in the picture 1. In another example, N is 4, the multiple key pictures correspond to pictures 0 to 3, and the 4 intra coded regions correspond to the section 0 in the picture 0, the section 1 in the picture 1, the section 2 in the picture 2, and the section 3 in the picture 3. Other correspondence between the intra coded regions and the respective sections can also be used. For example, the 4 intra coded regions can also correspond to the section 1 in the picture 0, the section 0 in the picture 1, the section 2 in the picture 2, and the section 3 in the picture 3.

FIG. 8 shows an example of multiple key pictures in a video sequence (801) according to an embodiment of the disclosure. The multiple key pictures include picture 0 to picture 3. The video sequence (801) also includes pictures 4-5 that do not include intra coded regions, and thus, the pictures 4-5 only include inter coded regions such as P regions and/or B regions.

A decoding order of the video sequence (801) is from left to right of the video sequence (801), and thus, is from the picture 0 to the picture 5. The multiple key pictures are consecutive pictures, i.e., the picture 0 to picture 3, in the decoding order. Each of the multiple key pictures can be partitioned into more than 1 segment. The segmentation of the regions inside a respective key picture can be done by one or a combination of methods including but not limited to the use of slice, tile, tile group, or the like. In FIG. 8, segmentation using slices is used as an example.

Each of the multiple key pictures includes an intra coded region. More specifically, the pictures 0 to 3 include intra coded regions (811)-(814), respectively. Each of the multiple key pictures also includes one or more inter coded regions. More specifically, the picture 0 includes an inter coded region (821), the picture 1 includes inter coded regions (822)-(823), the picture 2 includes inter coded regions (824)-(825), and the picture 3 includes an inter coded region (826). In an example, the intra coded regions (811)-(814) are I slices, and the inter coded regions (821)-(826) are P and/or B slices.

Referring to FIG. 8, the intra coded regions (811)-(814) are complementary, and thus, one of the intra coded regions (811)-(814) is complementary to remaining ones of the intra coded regions (811)-(814). For example, the intra coded region (811) is complementary to the intra coded regions (812)-(814). The multiple key pictures (i.e., the pictures 0-3) include the intra coded regions (811)-(814) having relative locations in the respective multiple key pictures that are different and a sum of sizes (or areas) of the intra coded regions (811)-(814) is equal to a picture size (or a picture area) of the multiple key pictures, such as the picture 0. Referring to FIG. 8, the four intra coded regions (811)-(814) of the respective picture 0-3 can form a non-overlapped picture in terms of the relative pixel locations in the respective pictures 0-3. In FIG. 8, the intra coded regions (811)-(814) are selected across the multiple key pictures by following an order from top to bottom of the respective key picture.

In an example, a relative location of a region or a picture can be represented by a top left sample of the region or the picture. Referring to FIG. 8 again, the pictures 0-5 have a same height H1. A number of the intra coded regions (811)-(814) is 4. Dashed lines (831)-(833) divide each of the multiple key pictures 0-3 into 4 sections 0-3 (S0-S3) with a section height of 1/4 H1 and a section size that is 1/4 of a picture size. The intra coded region (811) corresponds to the section 0 (S0) of the picture 0 and a top left sample of the intra coded region (811) is a top left sample of the picture 0. The intra coded region (812) corresponds to the section 1 (S1) of the picture 1 and a top left sample of the intra coded region (812) is located 1/4 H1 below the top left sample of the picture 1. The intra coded region (813) corresponds to the section 2 (S2) of the picture 2 and a top left sample of the intra coded region (813) is located 2/4 (i.e., 1/2) H1 below a top left sample of the picture 2. The intra coded region (814) corresponds to the section 3 (S3) of the picture 3 and a top left sample of the intra coded region (814) is located 3/4 H1 below a top left sample of the picture 3. Therefore, the intra coded regions (811)-(813) are complementary.

The intra coded regions can also be distributed differently across the multiple key pictures. For example, the 4 intra coded regions of the multiple key pictures (i.e., the pictures 0-3) include the section 1 (S1) in the picture 0, the section 0 (S0) in the picture 1, the section 2 (S2) in the picture 2, the section 3 (S3) in the picture 3. Other suitable distributions can also be implemented.

In general, intra coded regions can also be selected by following other suitable orders, such as shown in FIGS. 9-10. Further, the intra coded regions can correspond to tiles, such as shown in FIG. 9. FIG. 9 shows an example of multiple key pictures in a video sequence (901) according to an embodiment of the disclosure. The multiple key pictures include pictures 0 to 3. The video sequence (901) also includes pictures 4 to 5 that do not include intra coded regions, and thus, all regions in the pictures 4-5 are inter coded regions such as P regions and/or B regions.

In FIG. 9, a decoding order of the video sequence (901) is from left to right of the video sequence (901), and thus, is from the picture 0 to the picture 5. The multiple key pictures are consecutive pictures, i.e., the pictures 0 to 3, in the decoding order. Each of the multiple key pictures includes an intra coded region. More specifically, the pictures 0 to 3 include intra coded regions (911)-(914), respectively. Each of the multiple key pictures includes three inter coded regions. More specifically, the picture 0 includes the inter coded regions (921)-(923), the picture 1 includes the inter coded regions (924)-(926), the picture 2 includes the inter coded regions (927)-(929), and the picture 3 includes the inter coded region (930)-(932). In an example, the intra coded regions (911)-(914) are I tiles, and the inter coded regions (921)-(932) are P and/or B tiles.

Referring to FIG. 9, the pictures 0-3 have a same width W2 and a same height H2. A number of the intra coded regions (911)-(914) is 4. Each of the pictures 0-3 includes 4 sections, a top left section 0 (S0), a top right section 1 (S1), a bottom left section 2 (S2), and a bottom right section 3 (S3). Each section size is 1/4 of a picture size. The intra coded region (911) is the top left section 0 of the picture 0 and a top left sample of the intra coded region (911) is a top left sample of the picture 0. The intra coded region (912) is the top right section 1 of the picture 1 and a top left sample of the intra coded region (912) is located 1/2 W2 to the right of a top left sample of the picture 1. The intra coded region (913) is the bottom left region 2 of the picture 2 and a top left sample of the intra coded region (913) is located 1/2 H2 below a top left sample of the picture 2. The intra coded region (914) is the bottom right region 3 of the picture 3 and a top left sample of the intra coded region (914) is located 1/2 H2 below and 1/2 W2 to the right of a top left sample of the picture 3. In FIG. 9, the intra coded regions (911)-(914) are selected by an order of the top left section 0, top right section 1, bottom left section 2, and bottom right section 3 in the respective pictures 0-3, respectively, and the intra coded regions (811)-(813) are complementary.

FIG. 10 shows an example of multiple key pictures in a video sequence (1001) according to an embodiment of the disclosure. The multiple key pictures include pictures 0 and 1. The video sequence (1001) also includes pictures 2-3 that do not include intra coded regions, and thus, all regions in the pictures 2-3 are inter coded regions such as P regions and/or B regions.

In FIG. 10, a decoding order of the video sequence (1001) is from left to right of the video sequence (1001), and thus, is from the picture 0 to the picture 3. The multiple key pictures are consecutive pictures, i.e., the pictures 0 to 1, in the decoding order. The picture 0 includes intra coded regions (1011)-(1012) and inter coded regions (1021)-(1022). The picture 1 includes intra coded regions (1013)-(1014) and inter coded regions (1023)-(1024). In an example, the intra coded regions (1011)-(1014) are I slices, and the inter coded regions (1021)-(1024) are P or B slices.

Referring to FIG. 10, the pictures 0-1 have a same height H3. A number of the intra coded regions (1011)-(1014) is 4. Dashed lines (1031)-(1033) divide each of the pictures 0-1 into four sections 0-3 with a section height 1/4 H3 and a section size that is 1/4 of a picture size. The intra coded region (1011) is the section 0 (S0) of the picture 0 and a top left sample of the intra coded region (1011) is a top left sample of the picture 0. The intra coded region (1012) is section 2 (S2) of the picture 0 and a top left sample of the intra coded region (1012) is located 2/4 (i.e., 1/2) H3 below the top left sample of the picture 0. The intra coded region (1013) is the section 1 (S1) of the picture 1 and a top left sample of the intra coded region (1013) is located 1/4 H3 below a top left sample of the picture 1. The intra coded region (1014) is the section 3 (S3) of the picture 1 and a top left sample of the intra coded region (1014) is located 3/4 H3 below the top left sample of the picture 1. The intra coded regions (1011)-(1014) are selected by an order including the sections 0 and 2 in the picture 0 and the sections 1 and 3 in the picture 1, and the intra coded regions (1011)-(1013) are complementary. In an example, the regions (1011)-(1014) are I slices, and the inter coded slices (1021-1024) are B slices and/or P slices.

In an embodiment, a key picture can be segmented into multiple regions by any suitable method including but not limited to the use of slice, tile, tile group, and/or the like. The key picture can include one or more intra coded regions that are coded using intra prediction only. The key picture can also include one or more inter coded regions that are coded using one or more previously coded regions in the key picture or in one or more different pictures.

In the examples shown in FIGS. 8-10, each key picture includes at least one intra coded region that is coded using intra prediction only. In the examples shown in FIGS. 8-10, the multiple key pictures are consecutive pictures in the decoding order of the video sequence. In other embodiments, multiple key pictures having intra coded regions in the video sequence are not consecutive pictures in a decoding order of a video sequence. Further, different selection orders of the intra coded regions may be utilized in other embodiments.

In an embodiment, for other pictures in a video sequence that are not key pictures, no particular constraints are imposed except that the other pictures cannot refer to coded information prior to decoding of an intra coded region of a key picture that is to be reconstructed first in the video sequence.

In an embodiment, a GOP size of a video sequence is a positive integer M. Accordingly, a reference structure and picture types can be repeated for every M pictures, and similar gradual intra coded region insertions can be made to the M pictures in the GOP. In an embodiment, only pictures at random access boundaries (also referred to as random access points in some embodiments) use the gradual intra coded region insertions for intra refreshment. For each of the N key pictures, a region having a region area of 1/N of a picture area can be coded in intra prediction only (such as an I slice). Referring to FIG. 8, the section i the picture i is coded using an I slice where i is 0, 1, 2, or 3.

In the above descriptions for allocating intra coded regions across multiple key pictures, a video bitstream may or may not be generated for random access purposes. A video bitstream can be random accessed from a key picture of multiple key pictures in the video bitstream, as further discussed detail below.

A direct reference can be defined as follows. When reconstructing a current region, a previously coded region is referred to directly for prediction purposes by signaling that the previously coded region is a reference for the current region, and thus, the previously coded region is a direct reference for the current region. For example, the previously coded region is the direct reference for the current region when the picture of the previously coded region is listed as a reference picture for the current region.

An indirect reference can be defined as follows. When reconstructing a current region, a first coded region is referred to for prediction purposes by signaling the first coded region as a reference for the current region. Further, the first coded region may use a second coded region as a reference either directly or indirectly. Then the second coded region is an indirect reference for the current region, even if the current region does not signal directly use of the second coded region as a reference.

In an embodiment, a video bitstream or a video sequence can include multiple random access intervals separated by random access boundaries. In an example, a random access interval of a random access boundary (also referred to as a random access point) starts from the random access boundary where video data in the random access interval can be independently decoded without knowing previously decoded data in one or more previous random access intervals. One or more intra coded regions within the random access interval can be a direct or an indirect reference for subsequent inter coded regions in the random access interval. Therefore, the inter coded regions in the random access interval can be decoded by referring to one or more regions in the same random access interval. In some examples, referring to an intra coded region of a previous random access interval directly or indirectly breaks the definition of random access boundary, and thus, video data in the random access interval may only refer to reference data directly or indirectly from the same random access interval, such as shown in FIG. 12.

Figure 11:
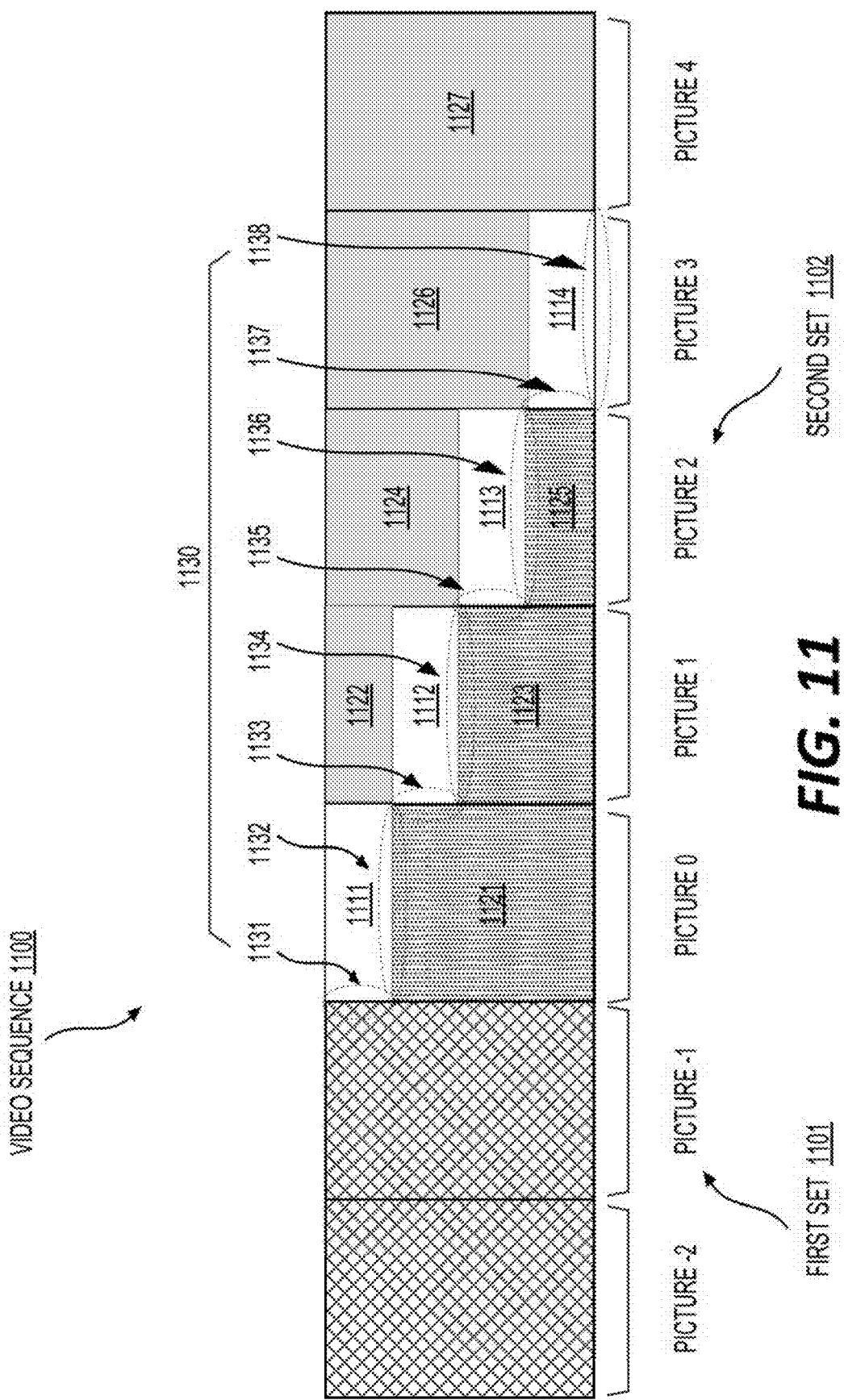
FIG. 11 shows an example of a first random access mode according an embodiment of the disclosure.
Figure 12:
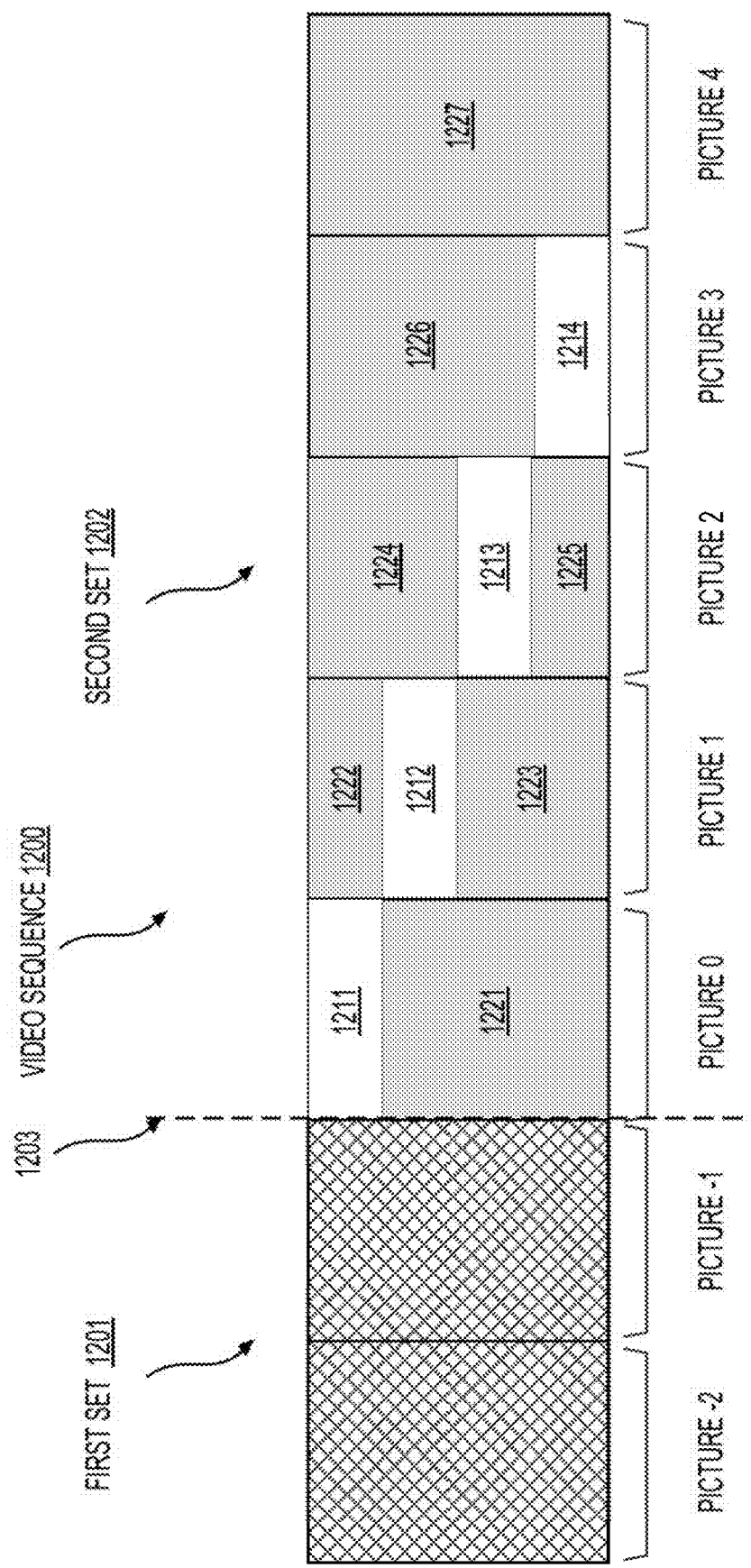
FIG. 12 shows an example of a second random access mode according an embodiment of the disclosure.

Two random access modes can be used in coding inter coded regions in multiple key pictures of a video sequence, as shown in FIGS. 11-12. FIG. 11 shows an example of a first random access mode according an embodiment of the disclosure. A video sequence (1100) includes a first set of pictures (1101) (also referred to as a first set (1101)) and a second set of pictures (1102) (also referred to as a second set (1102)). The first set (1101) includes pictures −2 to −1. The second set (1102) includes pictures 0 to 4. The second set (1102) includes multiple key pictures, i.e., the pictures 0 to 3. Each of the pictures 0 to 3 includes an intra coded region and one or more inter coded regions. The pictures 0 to 3 include the intra coded regions (1111)-(1114) and the inter coded regions (1121)-(1126). The picture 4 is an inter coded picture including one or more inter coded regions.

In FIG. 11, a decoding order is from left to right, i.e., from the picture −2 to the picture 4. The descriptions below can be suitably adapted for other decoding orders. A random access boundary (1130) spans across the multiple key pictures (i.e., the pictures 0 to 3) and includes multiple boundaries (1131)-(1138), such as the partial boundaries (1131), (1133), (1135), and (1137) between adjacent pictures in the decoding order, the region boundaries (1132), (1134), and (1136) between adjacent regions in a same picture, and the boundary (1138). In an example, the boundary (1138) can be a picture boundary, or the like. In an embodiment, a plurality of random access boundaries including the random access boundary (1130) divides the video sequence (1100) into a plurality of random access intervals. Pictures from more than one of the plurality of random access intervals can share common information, such as sequence header information (e.g., a sequence parameter set (SPS)).

A first part of the video sequence (1100) that is below or to the left of the random access boundary (1130) can include the pictures −2 to −1 and portions of the pictures 0-2, such as the inter coded regions (1121), (1123), and (1125). In the example shown in FIG. 11, the first part of the video sequence (1100) is associated with (or belongs to) a previous random access interval that is below or to the left of the random access boundary (1130). Accordingly, the pictures −2 to −1 and the inter coded regions (1121), (1123), and (1125) in the first part of the video sequence (1100) are associated with the previous random access interval of a previous random access boundary in the video sequence (1100) or a previously decoded video sequence. The inter coded regions (1121), (1123), and (1125) in the key pictures 0-2 that are associated with the previous access interval can refer to previously coded pictures and/or the coded regions of the same picture that have been decoded, even though the previously coded pictures or the coded regions of the same picture are associated with a different random access interval, in one embodiment.

A second part of the video sequence (1100) that is above or to the right of the random access boundary (1130) can include the picture 4 and portions of the pictures 0-3, such as the inter coded regions (1122), (1124), and (1126) and the intra coded regions (1111)-(1114). The second part of the video sequence (1100) is associated with (or belongs to) a current random access interval that corresponds to the random access boundary (1130). Accordingly, the picture 4, the inter coded regions (1122), (1124), and (1126), and the intra coded regions (1111)-(1114) in the second part of the video sequence (1100) are associated with the current random access interval of the random access boundary (1130).

The inter coded regions (1122), (1124), and (1126) of the key pictures 1-3 that are associated with the current random access interval can only use previously coded data in the same random access interval for reference in one embodiment. In an example, the intra coded region (1111) is decoded first in the current random access interval of the video sequence (1100).

The first random access mode can be used in coding the inter coded regions (1121)-(1126) in the multiple key pictures as follows.

For an inter coded region in a key picture in the second set (1102), if there are no collocated intra coded regions in one or more previously coded key pictures in the second set (1102) that are coded using intra prediction only, the inter coded region may refer to information of one or more previously coded pictures, in addition to one or more coded regions of the same key picture. The one or more previously coded pictures can be associated with the previous random access interval and the one or more coded regions can be associated with the current random access interval. In other words, the inter coded regions (1121), (1123), and (1125) that are below or to the left of the random access boundary (1130) satisfy the above described condition, and thus, can refer to information of the picture −2 and/or −1, and/or one of the intra coded regions (1111)-(1113) and the inter coded regions (1122) and (1124) in the respective key picture. As described above, the inter coded regions (1121), (1123), and (1125) can be coded using previously coded regions, such as the information of pictures (e.g., the picture −2 or −1 associated with the previous random access interval), and/or the one of the intra coded regions (1111)-(1113) and the inter coded regions (1122) and (1124) in the respective key picture that are associated with the current random access interval.

For example, the inter coded region (1123) of the picture 1 can refer to information or data in the previously coded pictures, such as the pictures −2 and −1 of the previous random access interval, to be coded. The inter coded region (1123) can also refer to the picture 0, the intra coded region (1112) and the inter coded region (1122) of the picture 1 when the picture 0, the intra coded region (1112) and the inter coded region (1122) of the picture 1 are previously coded. Accordingly, the inter coded region (1123) associated with the previous random access interval can be coded using information associated with the previous random access interval, previously coded information associated with the current random access interval, or the like.

For an inter coded region of a key picture in the second set (1102), if there is a collocated region in a previously coded key picture that is coded using intra prediction only in the second set (1102), the inter coded region of the key picture may refer to information of one or more previously intra coded regions from the multiple key pictures associated with the current random access interval as well as one or more previously coded inter coded regions of the key pictures. The one or more previously coded inter coded regions is associated with the current random access interval and does not have direct or indirect references from previously coded intra coded regions in one or more previous random access intervals, such as the previous random access interval. The one or more previously coded inter coded regions may refer to previously coded intra coded regions in the key pictures of the current random access interval in some embodiments.

For example, the inter coded region (1124) of the picture 2 can refer to the inter coded region (1122) and the intra coded region (1112) of the picture 1 and the intra coded region (1111) of the picture 0. The inter coded region (1124) cannot refer to the inter coded region (1123) of the picture 1 or the inter coded region (1121) of the picture 0 because the inter coded regions (1121) and (1123) are below or to the left of the random access boundary (1130) and are associated with the previous random access interval.

In the example shown in FIG. 11, the inter coded regions (1122), (1124), and (1126) that are associated with the current random access interval corresponding to the random access point (1130) can be coded using information associated with the current random access interval. Further, the inter coded regions (1122), (1124), and (1126) cannot be coded using information associated with the previous random access interval. Accordingly, errors in one or more previous random access intervals prior to the random access boundary (1130) cannot propagate to regions or pictures beyond the random access boundary (1130), such as regions or pictures within the current random access interval. Therefore, in the first random access mode, video data can be more resilient to error propagation. The random access boundary (1130) is considered 'loose' and the first random access mode is considered a 'loose' mode since a portion of a key picture can be below or to the left of the random access boundary (1130) and another portion of the same key picture can be above or to the right of the random access boundary (1130). For example, the inter coded region (1121) is below or to the left of the random access boundary (1130), and the intra coded region (1111) is above the random access boundary (1130). In other words, the random access boundary (1130) can divide the key picture into multiple portions that are associated with multiple random access intervals.

When performing random access by decoding from key pictures in the first random access mode, available data in a key picture can be located in a portion of a key picture where the available data is used to code a region in the current random access interval. In an embodiment, the available data in the picture 0 is located in the intra coded region (1111) or a partial picture 0 that excludes the inter coded region (1121). The available data in the picture 1 is located in the intra coded region (1112) and the inter coded region (1122) or a partial picture 1 that excludes the inter coded region (1123). The available data in the picture 2 is located in the intra coded region (1113) and the inter coded region (1124) or a partial picture 2 that excludes the inter coded region (1125).

FIG. 12 shows an example of a second random access mode according an embodiment of the disclosure. A video sequence (1200) includes a first set of pictures (1201) (also referred to as a first set (1201)) and a second set of pictures (1202) (also referred to as a second set (1202)). The first set (1201) includes pictures −2 to −1. The second set (1202) includes pictures 0 to 4. The second set (1202) includes multiple key pictures, i.e., the pictures 0 to 3. Each of the pictures 0 to 3 includes an intra coded region and one or more inter coded regions. The pictures 0 to 3 include the intra coded regions (1211)-(1214) and the inter coded regions (1221)-(1226). The picture 4 is an inter coded picture including one or more inter coded regions.

In FIG. 12, a decoding order is from left to right, i.e., from the picture −2 to the picture 4. The descriptions below can be suitably adapted for other decoding orders. Accordingly, a random access boundary or a random access point (1203) for the second random access mode starts from the intra coded region (1211) that is reconstructed first in the second set (1202). The random access point (1203) corresponds to a single picture boundary between the adjacent pictures −1 and 0. Accordingly, a current random access interval of the random access point (1203) starts at the random access point (1203) and includes the second set (1202).

The second random access mode can be used in coding the inter coded regions (1221)-(1226) in the multiple key pictures (i.e., the pictures 0 to 3) as below. All subsequent data after the intra coded region (1211) in the picture 0 and pictures decoded later in the decoding order can refer to the decoded data of the current random access interval where all the subsequent data are in the current random access interval. Accordingly, the entire key pictures 0 to 3 belong to the current random access interval. Any inter coded regions in the current random access interval whether the inter coded regions are inside a key picture or not, may not refer to information from a previous random access interval that is to the left of the random access point (1203), directly or indirectly.

Therefore, the inter coded regions (1221)-(1226) in the multiple key pictures are decoded based on information within the current random access point interval, such as the pictures 0 to 3. Further, the inter coded regions (1221)-(1226) cannot be decoded based on information of the previous random access interval, such as the pictures −2 to −1. The second random access mode can facilitate random access of video data.

Figure 13:
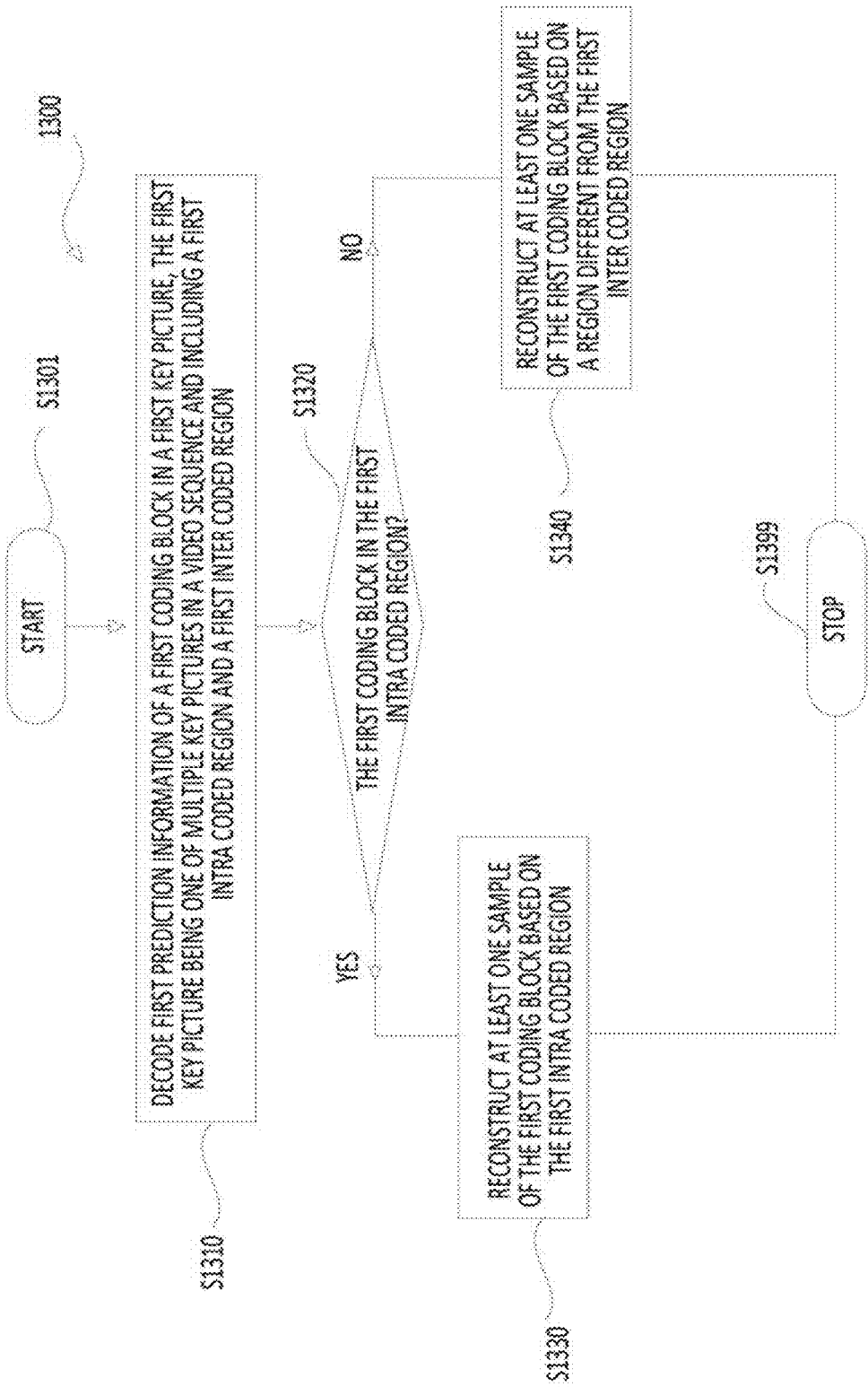
FIG. 13 shows a flow chart outlining a process (1300) according to an embodiment of the disclosure.

FIG. 13 shows a flow chart outlining a process (1300) according to an embodiment of the disclosure. The process (1300) can be used in the reconstruction of a first coding block coded in inter prediction, so to generate a prediction block for the first coding block under reconstruction. In various embodiments, the process (1300) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), the processing circuitry that performs functions of the predictor (535), and the like. In some embodiments, the process (1300) is implemented in software instructions, thus when the processing circuitry executes the software instructions, the processing circuitry performs the process (1300). The process starts at (S1301) and proceeds to (S1310).

At (S1310), first prediction information of a first coding block in a first key picture is decoded from a coded video bitstream. The first key picture is one of multiple key pictures in a video sequence and includes a first intra coded region and a first inter coded region. The first prediction information can indicate that the first coding block is in one of: the first intra coded region and the first inter coded region. Referring to FIGS. 8-12, in various examples, the video sequence can be one of the video sequences (801), (901), (1001), (1100), and (1200). The first key picture can be one of the key pictures shown in FIGS. 8-12. The first intra coded region can be one of the intra coded regions (811)-(814), (911)-(914), (1011)-(1014), (1111)-(1114), and (1211)-(1214). The first inter coded region can be one of the inter coded regions (821)-(826), (921)-(932), (1021)-(1024), (1121)-(1126), and (1221)-(1226). In an example, the first picture is the key picture 0 in FIG. 8, the first intra coded region is the intra coded region (801), and the first inter coded region is the inter coded region (821). The first intra and inter coded regions can be slices, tiles, tile groups, or the like. In an example, the multiple key pictures are consecutive pictures in a decoding order of the video sequence. In an example, intra coded region in the multiple key pictures are complementary.

At (S1320), whether the first coding block is in the first intra coded region is determined, for example, based on locations and sizes of the first coding block and the first intra coded region. When the first coding block is determined to be in the first intra coded region, the process (1300) proceeds to (S1330). Otherwise, the first coding block is determined to be in the first inter coded region, and thus, the process (1300) proceeds to (S1340).

At (S1330), the first coding block is in the first intra coded region, and at least one sample of the first coding block is reconstructed based on the first intra coded region. For example, the at least one sample of the first coding block is reconstructed only based on the first intra coded region without using information of another region in the first key picture or other pictures in the video sequence. The process (1300) proceeds to (S1399) and terminates.

At (S1340), the first coding block is in the first inter coded region, and at least one sample of the first coding block is reconstructed based on a region different from the first inter coded region. In an example, the region different from the first inter coded region is the first intra coded region. In an example, the region different from the first inter coded region can be a previously decoded region that is in a different picture. The process (1300) proceeds to (S1399) and terminates.

Note that the process (1300) can be suitably adapted. For example, additional steps can be added to decode a second coding block in a second key picture of the multiple key pictures in the video sequence. For example, second prediction information of the second coding block is decoded from the coded video bitstream. The second key picture includes a second intra coded region and a second inter coded region. The second prediction information can indicate that the second coding block is in one of: the second intra coded region and the second inter coded region. When the second coding block is determined to be in the second intra coded region, at least one sample of the second coding block is reconstructed based on the second intra coded region. For example, the at least one sample of the first coding block is reconstructed only based on the second intra coded region without using information of another region in the video sequence. When the second coding block is determined to be in the second inter coded region, at least one sample of the second coding block is reconstructed based on a region different from the second inter coded region.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
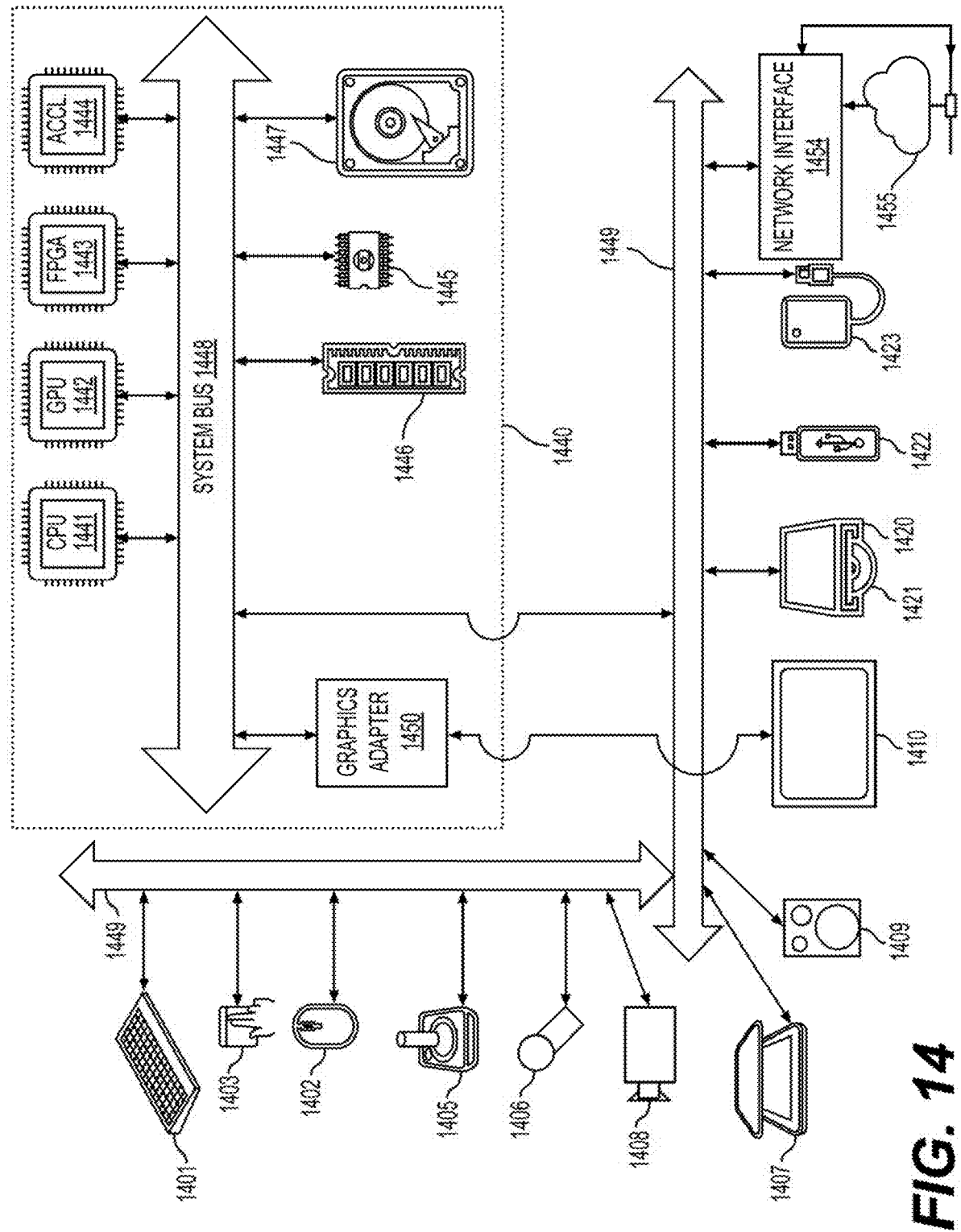
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PC, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
AMVP: Advanced Motion Vector Prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising: decoding first prediction information of a first coding block in a first key picture from a coded video bitstream, the first key picture being one of multiple key pictures in a video sequence and including a first intra coded region and a first inter coded region, the first prediction information indicating that the first coding block is in one of: the first intra coded region and the first inter coded region, the first key picture including one or more intra coded regions that includes the first intra coded region, the multiple key pictures including a second key picture that has a second intra coded region and a second inter coded region that is decoded after the second intra coded region, the second key picture being reconstructed after the first key picture; when the first prediction information indicates that the first coding block is in the first intra coded region, reconstructing at least one sample of the first coding block based on the first intra coded region; when the first prediction information indicates that the first coding block is in the first inter coded region, reconstructing the at least one sample of the first coding block based on a region different from the first inter coded region; determining whether at least one of the one or more intra coded regions has a same relative location in the first key picture as that of the second inter coded region in the second key picture, when the at least one of the one or more intra coded regions and the second inter coded region are in the same relative location, decoding the second inter coded region based on at least one of: the one or more intra coded regions and the second intra coded region only when the at least one of the one or more intra coded regions and the second intra coded region is in a current random access interval; and when none of the one or more intra coded regions and the second inter coded region are in the same relative location, decoding the second inter coded region based on at least one of: a previous random access interval, the first key picture, and the second intra coded region.

2. The method of claim 1, further comprising: decoding second prediction information of a second coding block in the second key picture from the coded video bitstream the second prediction information indicating that the second coding block is in one of: the second intra coded region and the second inter coded region; when the second prediction information indicates that the second coding block is in the second intra coded region, reconstructing at least one sample of the second coding block based on the second intra coded region; and when the second prediction information indicates that the second coding block is in the second inter coded region, reconstructing the at least one sample of the second coding block based on a region different from the second inter coded region.

3. The method of claim 2, wherein the multiple key pictures are consecutive pictures in a decoding order in the video sequence.

4. The method of claim 1, wherein the multiple key pictures include intra coded regions having relative locations in the respective multiple key pictures and inter coded regions, the intra coded regions of the multiple key pictures including the first intra coded region, the inter coded regions of the multiple key pictures including the first inter coded region; and the relative locations of the intra coded regions of the multiple key pictures are different.

5. The method of claim 4, wherein a sum of sizes of the intra coded regions of the multiple key pictures is equal to a size of the first key picture.

6. The method of claim 1, wherein the first intra coded region is one of: a slice, a tile, and a tile group.

7. The method of claim 1, wherein the first prediction information further indicates that the first inter coded region is in the previous random access interval and the first intra coded region is in the current random access interval, a random access point separates the previous and the current random access intervals in the video sequence, the first key picture is to be reconstructed first in the multiple key pictures and the region different from the first inter coded region is in one of: the previous random access interval and the first key picture.

8. The method of claim 7, wherein the second key picture is reconstructed second in the multiple key pictures.

9. The method of claim 1, wherein the first prediction information further indicates that the first key picture is to be reconstructed first in a random access interval of a random access point in the video sequence and the random access point for the random access interval starts from the first intra coded region.

10. The method of claim 9, wherein the multiple key pictures have intra coded regions including the first intra coded region and inter coded regions including the first inter coded region; the region different from the first inter coded region is the first intra coded region; and the method further includes decoding the remaining inter coded regions other than the first inter coded region based only on the random access interval.

11. An apparatus for video decoding, comprising: processing circuitry configured to: decode first prediction information of a first coding block in a first key picture from a coded video bitstream, the first key picture being one of multiple key pictures in a video sequence and including a first intra coded region and a first inter coded region, the first prediction information indicating that the first coding block is in one of: the first intra coded region and the first inter coded region, the first key picture including one or more intra coded regions that includes the first intra coded region, the multiple key pictures including a second key picture that has a second intra coded region and a second inter coded region that is decoded after the second intra coded region, the second key picture being reconstructed after the first key picture; when the first prediction information indicates that the first coding block is in the first intra coded region, reconstruct at least one sample of the first coding block based on the first intra coded region; when the first prediction information indicates that the first coding block is in the first inter coded region, reconstruct the at least one sample of the first coding block based on a region different from the first inter coded region; determine whether at least one of the one or more intra coded regions has a same relative location in the first key picture as that of the second inter coded region in the second key picture: when the at least one of the one or more intra coded regions and the second inter coded region are in the same relative location, decode the second inter coded region based on at least one of: the one or more intra coded regions and the second intra coded region only when the at least one of the one or more intra coded regions and the second intra coded region is in a current random access interval; and when none of the one or more intra coded regions and the second inter coded region are in the same relative location, decode the second inter coded region based on at least one of: a previous random access interval, the first key picture, and the second intra coded region.

12. The apparatus of claim 11, wherein the processing circuitry is further configured to: decode second prediction information of a second coding block in the second key picture from the coded video bitstream, the second prediction information indicating that the second coding block is in one of: the second intra coded region and the second inter coded region; when the second prediction information indicates that the second coding block is in the second intra coded region, reconstruct at least one sample of the second coding block based on the second intra coded region; and when the second prediction information indicates that the second coding block is in the second inter coded region, reconstruct the at least one sample of the second coding block based on a region different from the second inter coded region.

13. The apparatus of claim 12, wherein the multiple key pictures are consecutive pictures in a decoding order in the video sequence.

14. The apparatus of claim 11, wherein the multiple key pictures include intra coded regions having relative locations in the respective multiple key pictures and inter coded regions, the intra coded regions of the multiple key pictures including the first intra coded region, the inter coded regions of the multiple key pictures including the first inter coded region; and the relative locations of the intra coded regions are different.

15. The apparatus of claim 14, wherein a sum of sizes of the intra coded regions of the multiple key pictures is equal to a size of the first key picture.

16. The apparatus of claim 11, wherein the first intra coded region is one of: a slice, a tile, and a tile group.

17. The apparatus of claim 11, wherein the first prediction information further indicates that the first inter coded region is in the previous random access interval and the first intra coded region is in the current random access interval, a random access point separates the previous and the current random access intervals in the video sequence, the first key picture is to be reconstructed first in the multiple key pictures and the region different from the first inter coded region is in one of: the previous random access interval and the first key picture.

18. The apparatus of claim 11, wherein the first prediction information further indicates that the first key picture is to be reconstructed first in a random access interval of a random access point in the video sequence and the random access point for the random access interval starts from the first intra coded region.

19. The apparatus of claim 18, wherein the multiple key pictures have intra coded regions including the first intra coded region and inter coded regions including the first inter coded region; the region different from the first inter coded region is the first intra coded region; and the processing circuitry is further configured to decode the remaining inter coded regions other than the first inter coded region based only on the random access interval.

20. A non-transitory computer-readable medium storing instructions which when executed by a computer for video decoding cause the computer to perform: decoding first prediction information of a first coding block in a first key picture from a coded video bitstream, the first key picture being one of multiple key pictures in a video sequence and including a first intra coded region and a first inter coded region, the first prediction information indicating that the first coding block is in one of: the first intra coded region and the first inter coded region, the first key picture including one or more intra coded regions that includes the first intra coded region, the multiple key pictures including a second key picture that has a second intra coded region and a second inter coded region that is decoded after the second intra coded region, the second key picture being reconstructed after the first key picture; when the first prediction information indicates that the first coding block is in the first intra coded region, reconstructing at least one sample of the first coding block based on the first intra coded region; when the first prediction information indicates that the first coding block is in the first inter coded region, reconstructing the at least one sample of the first coding block based on a region different from the first inter coded region; determining whether at least one of the one or more intra coded regions has a same relative location in the first key picture as that of the second inter coded region in the second key picture; when the at least one of the one or more intra coded regions and the second inter coded region are in the same relative location, decoding the second inter coded region based on at least one of: the one or more intra coded regions and the second intra coded region only when the at least one of the one or more intra coded regions and the second intra coded region is in a current random access interval; and when none of the one or more intra coded regions and the second inter coded region are in the same relative location, decoding the second inter coded region based on at least one of: a previous random access interval, the first key picture, and the second intra coded region.

* * * * *